(12) United States Patent
Mariman et al.

(10) Patent No.: US 7,438,006 B2
(45) Date of Patent: Oct. 21, 2008

(54) AGRICULTURAL SEEDING MACHINE WITH COMPACT FURROW OPENER/CLOSER

(75) Inventors: Nathan A. Mariman, Mohomet, IL (US); Ronald T. Flowers, Osco, IL (US); Michael E. Frasier, East Moline, IL (US)

(73) Assignee: Deere & Company, Moline, IL (US)

( * ) Notice: Subject to any disclaimer, the term of this patent is extended or adjusted under 35 U.S.C. 154(b) by 413 days.

(21) Appl. No.: 11/259,828

(22) Filed: Oct. 27, 2005

(65) Prior Publication Data

US 2007/0095261 A1 May 3, 2007

(51) Int. Cl.
*A01C 5/00* (2006.01)
*A01C 13/00* (2006.01)
(52) U.S. Cl. .................. 111/164; 111/193; 111/195
(58) Field of Classification Search .............. 111/164, 111/163, 157, 149, 190–196
See application file for complete search history.

(56) References Cited

U.S. PATENT DOCUMENTS

| | | | | |
|---|---|---|---|---|
| 2,577,775 | A | * 12/1951 | Lemmon et al. ............ 111/195 |
| 4,331,205 | A | * 5/1982 | Sorenson et al. ............ 172/538 |
| 5,398,771 | A | * 3/1995 | Hornung et al. ............ 172/311 |
| 5,595,130 | A | 1/1997 | Baugher et al. ............. 111/52 |
| 5,619,939 | A | 4/1997 | Herman et al. ............. 111/163 |
| 6,347,594 | B1 | 2/2002 | Wendling et al. ........... 111/167 |
| 6,386,127 | B1 | 5/2002 | Prairie et al. ............... 111/167 |
| 6,530,334 | B2 | 3/2003 | Hagny ....................... 111/189 |
| 6,715,433 | B1 | 4/2004 | Friestad ..................... 111/177 |

* cited by examiner

*Primary Examiner*—Christopher J. Novosad
(74) *Attorney, Agent, or Firm*—Taylor & Aust, P.C.

(57) ABSTRACT

An agricultural seeding machine movable in a planting direction includes a frame; a disc opener assembly carried by the frame and having a first axis of rotation; a gauge wheel assembly carried by the frame and having a second axis of rotation, and a press wheel assembly carried by the frame and having a third axis of rotation. The second axis is positioned forward of the first axis relative to the planting direction. The gauge wheel assembly overlaps the disc opener assembly relative to the planting direction. The third axis is positioned rearward of the first axis relative to the planting direction. The press wheel assembly overlaps the disc opener assembly relative to the planting direction.

15 Claims, 3 Drawing Sheets

AGRICULTURAL SEEDING MACHINE WITH COMPACT FURROW OPENER/CLOSER

FIELD OF THE INVENTION

The present invention relates to agricultural machines, and, more particularly, to furrow openers and closers for agricultural seeding machines.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper, insecticide hopper, furrow opener/closer, etc.

One type of opener/closer arrangement uses a depth gauge wheel which is placed ahead of the leading edge of a single disc opener assembly including a seed tube on the trailing side of the disc. The wheel provides depth adjustment, cleans the leading face of the disc, and limits soil lifting and throw adjacent the disc. One or more closing wheels trail the disc to move soil and close the furrow over the material deposited from the seed tube. Such openers limit soil disturbance, but often a portion of the seed boot or runner operates soil just outside the seed trench which increases soil disturbance, power requirements, wear and seed placement inconsistencies. The leading side wheel axis is close to the disc hub so the wheel operates forwardly of the area where the disc exits the soil so soil lift at the exit point can be a problem, particularly when the operating depth of the disc is increased. If the boot lies outside the furrow, tracking problems are also increased.

With a single disc opener arrangement of this type, the closing wheels trail the seed boot a substantial distance. The actual closing of the furrow occurs sometime after the deposited material reaches the bottom of the furrow, and the material has time to bounce from the bottom of the furrow and as a result the material may be placed shallower than desired. At times, the deposited material can actually bounce completely out of the furrow and lie on top of the ground. Seeds which lie on top of the ground will not germinate. An opener arrangement of this type also has increased geometric space requirements since the gauge wheel, disc opener and closing wheels are sequentially arranged relative to the planting direction.

U.S. Pat. No. 6,347,594 (Wendling et al.), which is assigned to the assignee of the present invention, discloses a furrow opener (FIGS. 1 and 5) having a single disc opener which forms a furrow in the soil. A depth gauge wheel is placed along the trailing edge of the single disc opener, and a further closing wheel is placed so as to generally overlie the seed trench.

What is needed in the art is a furrow opener/closer arrangement which effectively closes a trench formed with a double disc opener at higher ground speeds, with less soil compaction and minimum geometric space requirements.

SUMMARY OF THE INVENTION

The present invention provides a row crop unit including a gauge wheel, disc opener blade and press wheel which are sequentially arranged and overlap relative to a planting direction.

The invention comprises, in one form thereof, an agricultural seeding machine movable in a planting direction and including a frame; a disc opener assembly carried by the frame and having a first axis of rotation; a gauge wheel assembly carried by the frame and having a second axis of rotation, and a press wheel assembly carried by the frame and having a third axis of rotation. The second axis is positioned forward of the first axis relative to the planting direction. The gauge wheel assembly overlaps the disc opener assembly relative to the planting direction. The third axis is positioned rearward of the first axis relative to the planting direction. The press wheel assembly overlaps the disc opener assembly relative to the planting direction.

DETAILED DESCRIPTION OF THE INVENTION

Figure 1:
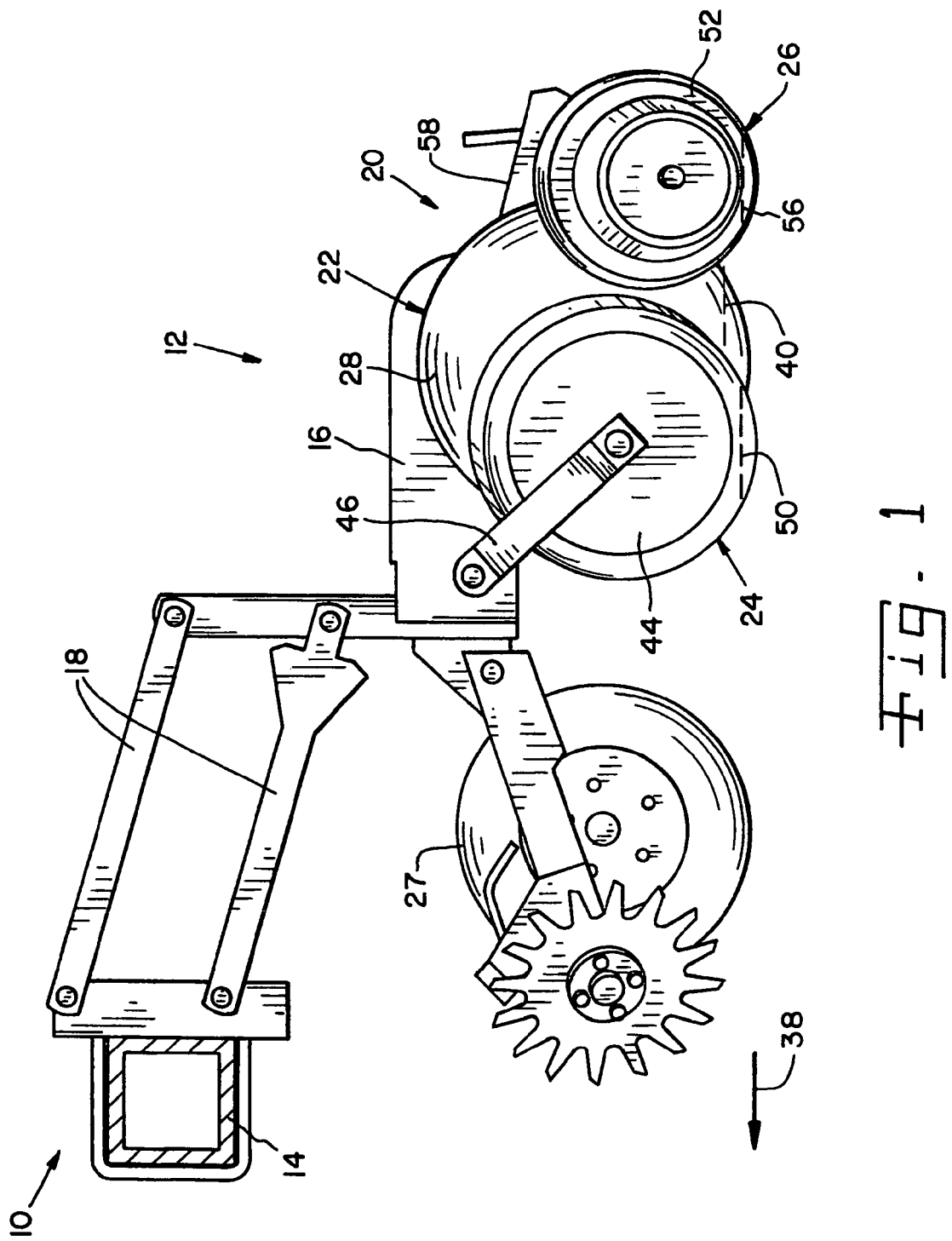
FIG. 1 is a side view of an embodiment of a seeding machine of the present invention including a portion of a row crop unit.
Figure 2:
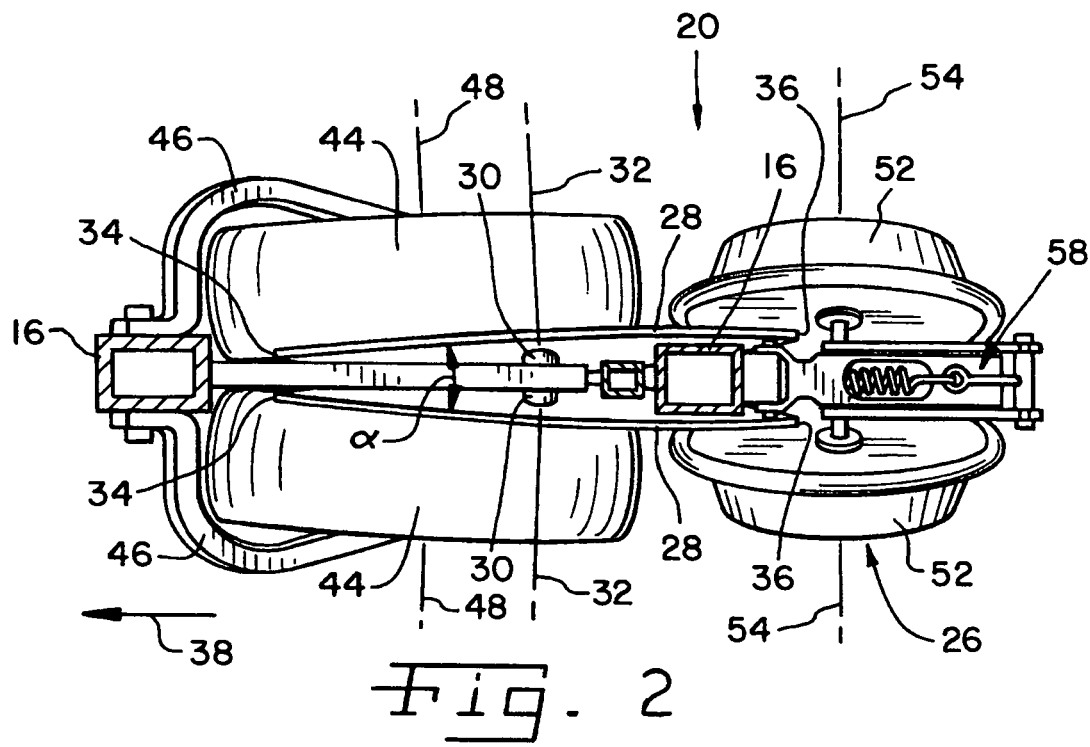
FIG. 2 is a top view of the furrow opener/closer shown in FIG. 1.

Referring now to the drawings, and more particularly to FIGS. 1 and 2, there is shown an embodiment of a seeding machine 10 of the present invention. In the embodiment shown, seeding machine 10 is in the form of a row crop planter but may also be in the form of a grain drill, etc. FIGS. 1 and 2 illustrate a single row crop unit 12 of a multi-row planter, with each row crop unit 12 being substantially identical and connected to a common tool bar 14. Only a single row crop unit 12 is shown for simplicity sake.

Row crop unit 12 includes a frame 16 which is attached to tool bar 14 by parallel linkage 18. Tool bar 14 is coupled to a traction unit (not shown), such as an agricultural tractor. For example, tool bar 14 may be coupled to an agricultural tractor using a 3-point hitch assembly. Tool bar 14 may be coupled with transport wheel assemblies, marker arms, etc. which may be of conventional design and not shown for simplicity sake. The transport wheels, in known manner, may provide ground drive to row crop unit 12 through the use of shafts, chains, sprockets, transfer cases, etc.

Frame 16 carries a furrow opener/closer 20, including a disc opener assembly 22, gauge wheel assembly 24 and press wheel assembly 26. The particular planting unit shown in FIG. 1 is in the form of a no-till planter having coultered no-till opening disks 27 also carried by frame 16 and used for management of debris on the ground.

Disc opener assembly 22 includes a pair of disc opener blades 28 which are positioned at a predetermined acute angle α (FIG. 2) relative to each other. Each disc opener blade 28 is carried by a corresponding bearing within a bearing housing 30 and is rotatable about a corresponding axis of rotation 32. Each disc opener blade 28 has a leading edge 34 and trailing edge 36 relative to planting direction 38. When inserted into soil, each disc opener blade 28 generally defines a contact line with the upper surface of the soil (neglecting unevenness of the soil), represented in approximation by dashed line 40 in FIG. 1.

Seed tube 42 positioned between disc opener blades 28 receives seed from a seed hopper (not shown) and directs the seed at a predetermined rate and spacing into the seed trench.

Seed tube 42 has a width in a direction transverse to the seed trench which is less than the width of the seed trench, but may also be approximately equal to the width of the seed trench.

Gauge wheel assembly 24 includes a pair of gauge wheels 44. Each gauge wheel 44 is positioned generally in line with and immediately adjacent to the outside of each respective disc opener blade 28 of disc opener assembly 22. Gauge wheels 44 are pivotally coupled with frame 16 by respective arms 46 and are vertically adjustable to adjust the depth of the trench which is cut into the soil using disc opener assembly 22. Each gauge wheel 44 is rotatable about a corresponding axis of rotation 48 which is positioned forward of an axis of rotation 32 of an adjacent disc opener blade 28. Each gauge wheel 44 overlaps the adjacent disc opener blade 28 relative to the direction of planting 38. More particularly, each gauge wheel overlies and defines a gauge wheel contact patch with the soil, represented in approximation by dashed line 50 in FIG. 1. The overlap between disc opener blade 28 and the corresponding gauge wheel 44 is such that gauge wheel 44 covers bearing housing 30 and gauge wheel contact patch 50 is positioned forward of axis of rotation 32 of the adjacent disc opener blade 28.

Press wheel assembly 26 includes a pair of press wheels 52 which close the seed trench. Each press wheel 52 is positioned adjacent to an outer side of a corresponding disc opener blade 28. Each press wheel 52 is rotatable about a corresponding axis of rotation 54 which is positioned rearward of an axis of rotation 32 of an adjacent disc opener blade 28. Each press wheel 52 overlaps the adjacent disc opener blade 28 relative to the direction of planting 38. More particularly, each gauge wheel overlies and defines a press wheel contact patch with the soil, represented in approximation by dashed line 56 in FIG. 1. The overlap between disc opener blade 28 and the corresponding press wheel 52 is such that press wheel 52 is positioned rearward of contact line 40 of the adjacent disc opener blade 28.

Press wheel assembly 26 is pivotally coupled with frame 16 by a down pressure adjustment system 58. In the embodiment shown in FIGS. 1 and 2, down pressure adjustment system 58 is configured as a pivot mechanism. The amount of down pressure which is applied to the soil adjacent to the seed trench may be adjusted depending on the application. For example, it may be necessary in certain applications (e.g., no till planting conditions) to apply a higher pressing force to the soil using press wheels 52 in order to effect adequate covering of the seed trench.

During use, gauge wheels 44 firm and level the soil bed ahead of disc opener blades 28. The depth and width of the furrow are controlled by raising or lowering gauge wheels 44. A selected seed type is received from a seed supply (e.g., seed hopper). The seeds are discharged from a seed metering system (not shown) at a predetermined rate to seed tube 42. The seed is discharged from seed tube 42 into the seed trench formed in the soil using disc opener blades 28 of disc opener assembly 22. Press wheels 52 collapse the soil adjacent to the seed trench resulting in covering of the seed trench.

Figure 3:
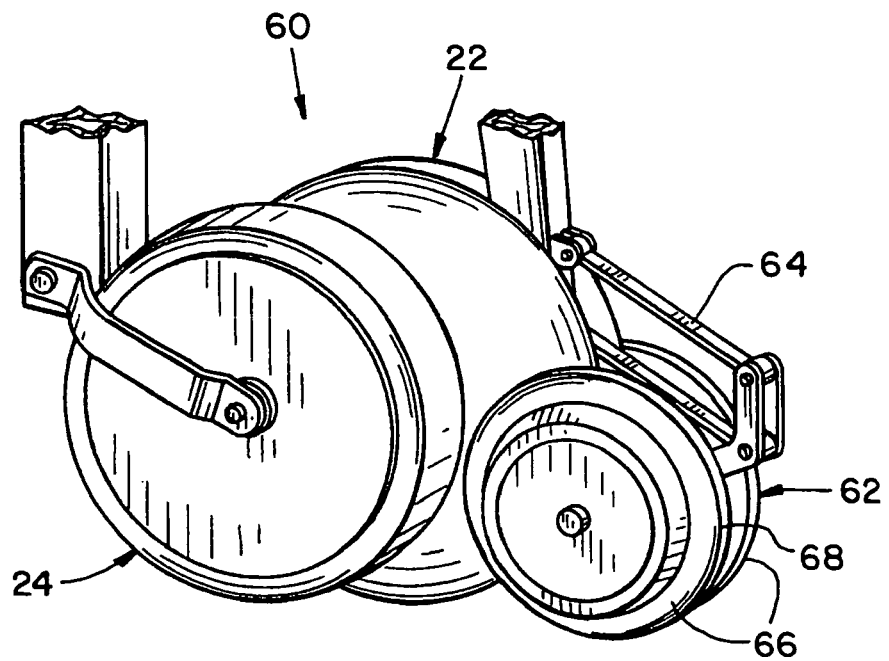
FIG. 3 is a side view of another embodiment of a furrow opener/closer of the present invention.
Figure 4:
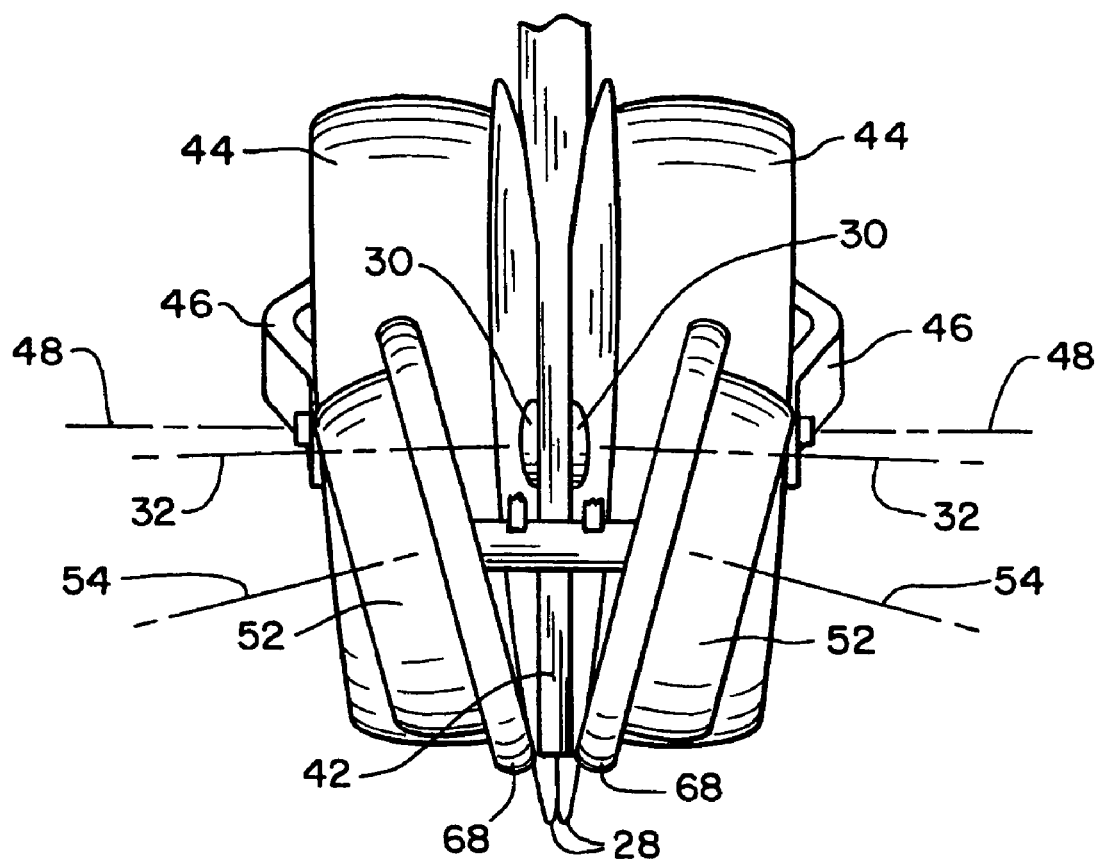
FIG. 4 is a rear view of the furrow opener/closer shown in FIG. 3.

FIGS. 3 and 4 illustrate another embodiment of a furrow opener/closer 60 of the present invention. Furrow opener/closer 60 includes a disc opener assembly 22 and gauge wheel assembly 24 which are configured the same as in the embodiment of row crop unit 12 shown in FIGS. 1 and 2. The primary difference in FIGS. 3 and 4 is the configuration of press wheel assembly 62. More particularly, press wheel assembly 62 includes a down pressure adjustment system 64 configured as a parallel linkage mechanism. Further, press wheel assembly 62 includes a pair of press wheels 66 each having a peripheral rim 68 adjacent the inner side of press wheel 66, and thus in turn adjacent to the seed trench formed by disc opener blades 28. Peripheral rim 68 provides localized increased pressure to the soil adjacent the seed trench to collapse and cover the seed trench.

Furrow opener/closer 50 and 60 of the present invention may be used at higher ground speeds (e.g., 5-7 mph) with the same or improved spacing accuracy between seeds. The seeds fall into the seed trench at a location immediately after opening of the trench with disc opener assembly 22. Gauge wheels 44 provide selective depth control and firm the seed bed ahead of disc opener blades 28. Press wheels 66 are positioned to close the seed trench immediately rearwardly of disc opener blades 28, thereby resulting in better closing of the trench when traveling on a curved travel path. Further, the geometric compactness of the row crop unit is improved.

Having described the preferred embodiment, it will become apparent that various modifications can be made without departing from the scope of the invention as defined in the accompanying claims.

The invention claimed is:

1. An agricultural seeding machine movable in a planting direction, comprising:
    a frame;
    a disc opener assembly carried by said frame and having a first axis of rotation and having an outer side away from said frame;
    a gauge wheel assembly carried by said frame and having a second axis of rotation, said second axis positioned forward of said first axis relative to said planting direction, said gauge wheel assembly overlapping said disc opener assembly relative to said planting direction; and
    a press wheel assembly carried by said frame and having a third axis of rotation, said third axis positioned rearward of said first axis relative to said planting direction, said press wheel assembly overlapping said disc opener assembly relative to said planting direction, said press wheel assembly being on the form of a pair of wheels positioned adjacent the outer sides of said disc opener assembly.

2. The agricultural seeding machine of claim 1, wherein said disc opener assembly includes a bearing housing, said gauge wheel assembly overlapping said bearing housing relative to said planting direction.

3. The agricultural seeding machine of claim 1, wherein said gauge wheel assembly defines a gauge wheel contact patch with soil, said gauge wheel contact patch positioned forward of said first axis of rotation relative to said planting direction.

4. The agricultural seeding machine of claim 1, wherein said gauge wheel assembly is vertically adjustably coupled with said frame.

5. The agricultural seeding machine of claim 1, wherein said press wheel assembly defines a press wheel contact patch with soil, and said disc opener assembly defines a contact line with the soil, said press wheel contact patch positioned rearward of said disc opener contact line relative to said planting direction.

6. The agricultural seeding machine of claim 1, wherein said press wheel assembly is vertically movably coupled with said frame, and includes an adjustable down force pressure system.

7. The agricultural seeding machine of claim 6, wherein said down force pressure system includes one of a pivot mechanism, and a parallel linkage.

8. The agricultural seeding machine of claim 1, wherein said gauge wheel assembly includes a pair of gauge wheels.

9. The agricultural seeding machine of claim 1, wherein said disc opener assembly includes a pair of disc blades.

10. The agricultural seeding machine of claim 1, wherein said press wheel assembly includes a pair of press wheels.

11. A furrow opener/closer for an agricultural seeding machine movable in a planting direction, comprising:
- a disc opener blade having a first axis of rotation and an outer facing side;
- a gauge wheel having a second axis of rotation, said second axis positioned forward of said first axis in said planting direction, said gauge wheel overlapping said disc opener blade in said planting direction; and
- a press wheel having a third axis of rotation, said third axis positioned rearward of said first axis in said planting direction, said press wheel overlapping said disc opener blade in said planting direction, said press wheel being positioned adjacent the outer facing side of said disc opener blade.

12. The furrow opener/closer of claim 11, wherein said disc opener blade includes a bearing housing, said gauge wheel overlapping said bearing housing relative to said planting direction.

13. The furrow opener/closer of claim 11, wherein said gauge wheel defines a gauge wheel contact patch with soil, said gauge wheel contact patch positioned forward of said first axis of rotation relative to said planting direction.

14. The furrow opener/closer of claim 11, wherein said press wheel defines a press wheel contact patch with soil, and said disc opener blade defines a contact line with the soil, said press wheel contact patch positioned rearward of said disc opener contact line relative to said planting direction.

15. A method of planting with an agricultural seeding machine moving in a planting direction, comprising the steps of:
- firming soil with a gauge wheel assembly;
- opening a seed trench in the firmed soil with a disc opener assembly, said disc opener assembly overlapping said gauge wheel assembly in the planting direction;
- depositing a seed in the opened seed trench; and
- closing the seed trench with a press wheel assembly, said press wheel assembly overlapping said disc opener assembly in the planting direction and being positioned adjacent the outer facing side of said disc opener assembly.

* * * * *